(12) United States Patent
Pound et al.

(10) Patent No.: US 9,990,392 B2
(45) Date of Patent: Jun. 5, 2018

(54) DISTRIBUTED TRANSACTION PROCESSING IN MPP DATABASES

(71) Applicants: Jeffrey Pound, Kitchener (CA); Nathan Auch, Waterloo (CA); Peter Bumbulis, Kitchener (CA); Anil Goel, Waterloo (CA)

(72) Inventors: Jeffrey Pound, Kitchener (CA); Nathan Auch, Waterloo (CA); Peter Bumbulis, Kitchener (CA); Anil Goel, Waterloo (CA)

(73) Assignee: SAP SE, Walldorf (DE)

( * ) Notice: Subject to any disclaimer, the term of this patent is extended or adjusted under 35 U.S.C. 154(b) by 464 days.

(21) Appl. No.: 14/680,675

(22) Filed: Apr. 7, 2015

(65) Prior Publication Data
US 2016/0299932 A1 Oct. 13, 2016

(51) Int. Cl.
*G06F 17/30* (2006.01)

(52) U.S. Cl.
CPC ............... *G06F 17/30377* (2013.01)

(58) Field of Classification Search
USPC .................................................. 707/687, 704
See application file for complete search history.

(56) References Cited

U.S. PATENT DOCUMENTS

| | | | | |
|---|---|---|---|---|
| 7,233,947 B2* | 6/2007 | Lomet | ............... | G06F 17/30551 707/703 |
| 7,677,441 B2* | 3/2010 | Bernstein | .......... | G06F 17/30348 235/379 |
| 7,761,434 B2* | 7/2010 | Surtani | ............. | G06F 17/30356 707/704 |
| 7,966,298 B2* | 6/2011 | Bruso | ............... | G06F 17/30362 707/675 |
| 8,060,482 B2* | 11/2011 | Wang | ...................... | G06F 8/458 707/702 |
| 8,219,676 B2* | 7/2012 | Jagadish | ............. | G06F 11/3476 709/216 |
| 8,468,134 B1* | 6/2013 | McHugh | ........... | G06F 17/30489 707/638 |
| 8,504,542 B2* | 8/2013 | Chang | ............... | G06F 17/30359 707/704 |
| 9,032,163 B2* | 5/2015 | Sudhakar | ................ | G06F 9/526 711/152 |

(Continued)

OTHER PUBLICATIONS

Balakrishnan, M., et al., "Tango: A Distributed Data Structures over a Shared Log," Proceedings of the 24th ACM Symposium on Operating Systems Principles, Nov. 2013; pp. 325-340.

(Continued)

*Primary Examiner* — Kim Nguyen
(74) *Attorney, Agent, or Firm* — Sterne, Kessler, Goldstein & Fox P.L.L.C.

(57) ABSTRACT

Disclosed herein are system, method, and computer program product embodiments for distributed transaction processing in massively parallel processing (MPP) databases. An embodiment operates by receiving a transaction including a read timestamp corresponding to a version of data of a database associated with the query. It is determined whether a locally stored portion of the data of the database has a local timestamp that is equivalent to or after the read timestamp. A lock may be requested, and if received, the data is updated.

20 Claims, 3 Drawing Sheets

(56) References Cited

U.S. PATENT DOCUMENTS 9,274,720 B1 * 3/2016 Ori .................... G06F 3/0653

OTHER PUBLICATIONS

Bernstein, P., et al., "Hyder—A Transactional Record Manager for Shared Flash," 5th Biennial Conference on Innovation Data Systems Research, Jan. 2011; pp. 9-20.
Ferro, D., et al., "Omid: Lock-free Transactional Support for Distributed Data Stores," 30th IEEE International Conference on Data Engineering, 2014; pp. 676-687.
Thomson, A., et al., "Calvin: Fast Distributed Transactions for Partitioned Database Systems," Proceedings of the 2012 ACM SIGMOD International Conference on Management of Data, May 2012; 12 pages.

* cited by examiner

DISTRIBUTED TRANSACTION PROCESSING IN MPP DATABASES

BACKGROUND

Massively parallel processing (MPP) databases are designed to scale to hundreds or thousands of nodes (or more) to provide parallel computing resources to process queries. An MPP database can simultaneously process large amounts of data to perform read-only analytics on the data. Typically, the data warehouses from which the MPP database draws its data are updated during off-peak hours, during which time bulk inserts of data are provided to the system. These databases, however, are unable to simultaneously provide MPP processing with real-time data updates without sacrificing the scalability and performance of the MPP database processing model.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for distributed transaction processing in massively parallel processing (MPP) databases.

Figure 1:
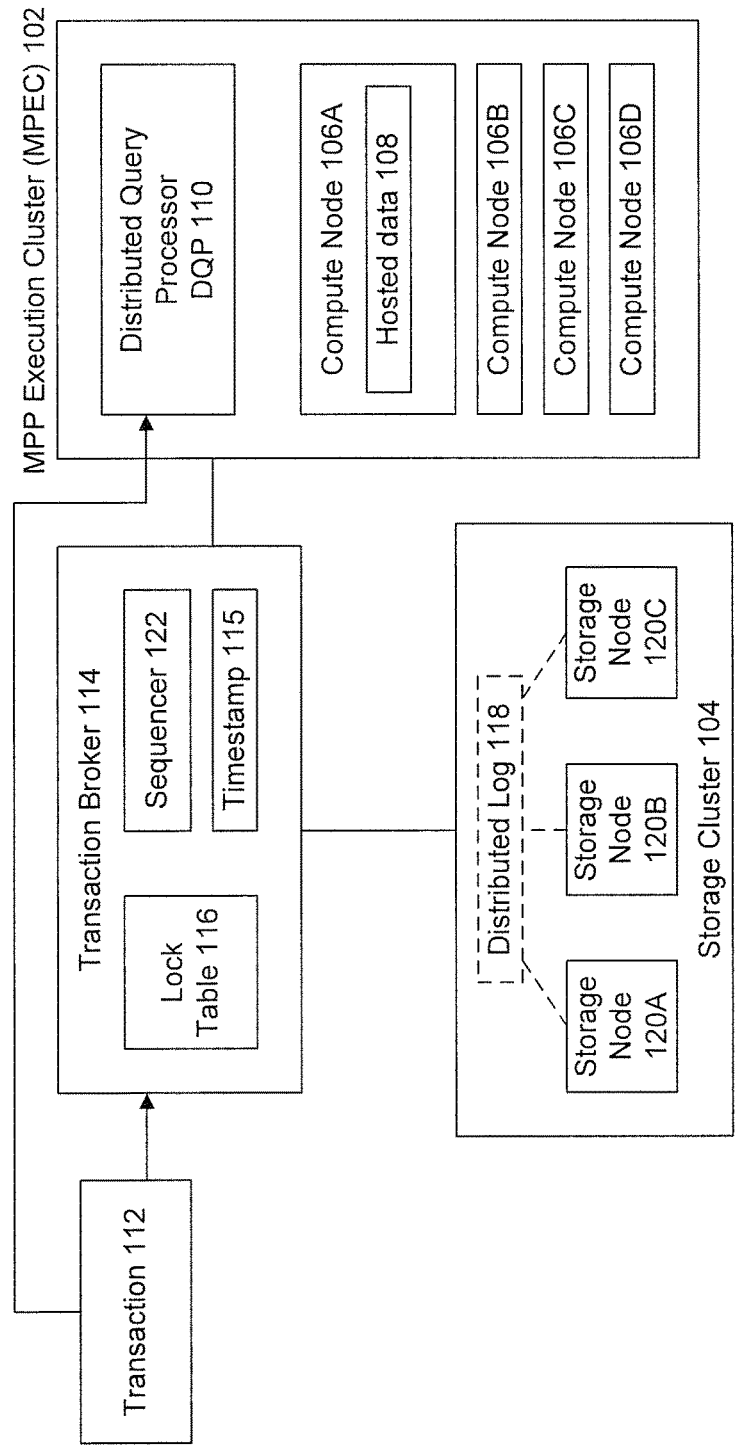
FIG. 1 is a block diagram of a database system in which an MPP execution cluster (MPEC) processes distributed transactions on data of a storage cluster, according to an example embodiment.

FIG. 1 is a block diagram of a database system in which an MPP execution cluster (MPEC) 102 processes distributed transactions 112 on data of a storage cluster 104, according to an embodiment.

MPEC 102 performs transaction processing on data from storage cluster 104. In an embodiment, the transaction processing performed by MPEC 102 is decoupled from the memory management functions associated with write transactions as performed by storage cluster 104. This decoupling of query processing from memory management transaction processing allows system 100 to achieve the processing benefits of an MPP database system, while having access to real-time streams of data being written to storage cluster 104.

Storage cluster 104 manages the memory and storage requirements associated with write transactions in system 100. In an embodiment, a transaction broker 114 may manage concurrency control, versioning, conflicts, and timestamps associated with the addition, deletion, and/or modification of data (e.g., write transactions) as stored in storage cluster 104.

MPEC 102 includes multiple compute nodes 106A-D that process transactions 112. Transaction 112 may include a read and/or write transaction. As described herein, a query may be an example of a read-only transaction. A query may be a transaction 112 for reading, sorting, or otherwise identifying a set of data from storage cluster 104 based on a set of criteria. For example, a query may seek to identify the account numbers with a balance greater than $1000. The actual processing of the query may be performed by one or more of compute nodes 106A-D.

Transaction 112 may also be or include a write portion or transaction. A write transaction may be a transaction for adding new data, or deleting or modifying existing data in storage cluster 104. In continuing the non-limiting example above, an example write transaction may be to add the letter "T" to the beginning of the account number for identified account balances greater than $1000. As will be discussed below, any number of different nodes may write data to storage cluster 104, including compute nodes 106A-D.

Compute nodes 106A-D may each host or store a hosted data 108. Hosted data 108 may be a local copy of a portion or slice of data from storage cluster 104. For example, compute node 106A may periodically receive snapshots of data from storage cluster 104. Compute node 106A may store these snapshots locally as hosted data 108, and process transactions 112 on the locally stored snapshots.

In an embodiment, the snapshots may be updates to the data already locally stored as hosted data 108. For example, hosted data 108 may be associated with a timestamp corresponding to when the data of the compute node 106A was last updated. In an embodiment, different compute nodes 106, even if hosting similar or identical data slices from storage cluster 104, may have different timestamps and may asynchronously be updated. Then for example, during data updates, snapshots from storage cluster 104 may include new data, or any updates that may have occurred on hosted data 108 between the timestamp of hosted data 108 and the current or most recently updated data.

MPEC 102 may include a distributed query processor (DQP) 110 that receives a transaction 112. MPEC 102 may then assign transaction 112 (or portions thereof) to one or more compute nodes 106A-D, receive responses from the compute nodes 106A-D, and assemble the result of the transaction 112. DQP 110 may assign transaction 112 to one or more compute nodes 106 based on an availability of the compute nodes 106A-D (e.g., which compute node 106A-D is first available), which data and/or versions are stored on the compute nodes 106A-D (relative to the data accessed by the transaction 112), or any other applicable method of query allocation.

For example, in an embodiment, DQP 110 may only assign transactions 112 corresponding to accessing data from Table 1 of storage cluster 104 to those compute nodes 106A-D that already have hosted data 108 corresponding to Table 1. This may, for example, limit the amount of updating and/or network traffic necessary to process transaction 112. Or, for example, DQP 110 may assign transactions 112 to compute nodes 106A-D based on availability and regardless of hosted data 108.

When a transaction 112 is received by system 100, a transaction broker 114 may assign or provide to the transaction a timestamp 115. Timestamp 115 may be a date/time stamp, sequence indicator, or other identifier that indicates which data has been committed to storage cluster 104. In an embodiment, while some compute nodes 106A-D are processing queries or read transactions 112 on data from storage cluster 104, other nodes (including other compute nodes 106A-D) may be writing data to storage cluster 104. As such, different data versions or timestamps 115 may exist and be active within system 100 at any given time. The timestamp 115 assigned or provided to transaction 112 may be used to identify the latest data committed to storage cluster 104, or which data version is to be use when processing transaction 112. Based on timestamp 115, compute nodes 106A-D may determine whether or not their hosted data 108 needs to be updated before processing transaction 112 (e.g., if the local timestamp for hosted data 108 is out-of-date relative to timestamp 115 of transaction 112, hosted data 108 may be need to be updated).

In an embodiment, transaction broker 114 may provide transaction 112 with an older timestamp 115. For example, if transaction 112 is a read-only transaction, transaction broker 114 may determine that the read-only transaction does not need the most current data, but data with a specified staleness or age would be acceptable. The staleness threshold may indicate, for example, a period of time or number of transactions for which an older timestamp 115 may be used by a read-only transaction. This may reduce or eliminate the need for compute nodes 106 to update their hosted data 108 when processing the read-only transaction 112.

Transaction broker 114 may keep assigning the same "old" timestamp 115 to all of the read-only transactions so that they all read the same version of data. This has two benefits, it means compute nodes 106 have to maintain fewer versions in memory (since all the transactions are requesting the same version of data), and the cost of pulling from the log and updating the in-memory structures is amortized across all transactions reading at the same version. Transaction broker 114 can periodically update this read-only timestamp (which in an embodiment, may be a separate timestamp from timestamp 115) according to a service-level agreement (SLA), e.g., every 10 seconds or 5 minutes.

DQP 110 may operate as a transaction coordinator for MPEC 102. In an embodiment, DQP 110 may receive transaction 112 and corresponding timestamp 115. DQP 110 may then assign and coordinate the processing transaction 112 amongst one or more compute nodes 106A-C. As noted above, compute nodes 106A-D may store hosted data 108, which may be a slice of data from storage cluster 104. Different compute nodes 106A-D may have different or similar slices of data from storage cluster 104. In an embodiment, DQP 100 may assign transaction 112 amongst compute nodes 106A-D based on which data is already locally stored as hosted data 108 on the compute nodes 106.

When assigned a transaction 112, a compute node 106 may compare a timestamp associated with its hosted data 108 against the timestamp 115 of the transaction 112 to determine whether or not the compute node 106 requires updated data to process the transaction 112. For example, compute node 106A may have hosted data 108 with timestamp (or version) T5 for Table 2 which is the same data used by transaction 112. Transaction 112 may receive a timestamp 115 indicating a time T7. Compute node 106A, being assigned to transaction 112, may then request from storage cluster 104 any changes to its hosted data 108 that occurred between times T5 and T7. Compute node 106A may, for example, query a distributed log 118 of storage cluster 104 to determine whether any changes have taken place to Table 2 between times T5 and T7.

If changes to Table 2 have occurred between T5 and T7, then compute node 106A may request and apply those changes to hosted data 108 and may update its local timestamp to T7. Alternatively, if no changes occurred to Table 2 between T5 and T7, compute node 106A may determine that no changes are needed to hosted data 108 to process transaction 112, and the local timestamp may be updated to indicate it is up to date to time T7. After verifying that its data is up to date with timestamp 115, compute node 106A may process transaction 112.

As a result of processing transaction 112 by compute nodes 106A-D, a portion of data from storage cluster 104 may need to be updated. In an embodiment, compute nodes 106 may locally cache changes made to the data as a result of the processing transaction 112. The resulting cached modifications from the transaction processing may then be written by compute nodes 106A-D, transaction broker 114, or any other node to storage cluster 104.

In an embodiment, compute nodes 106A-D may be stateless (and transient or without data persistence) with regard to the hosted data 108. The state management of data may be handled by a transaction broker 114 and/or storage cluster 104 as described in greater detail below. The data in storage cluster 104 corresponding to hosted data 108 while being processed locally by a first compute node 108A may simultaneously be changed by a second compute node 108B at storage cluster 104. As such, before data is written to storage cluster 104, a conflict check must be performed and a lock acquired to ensure that the hosted data 108 did not change in storage cluster 104 while the transaction 112 was being processed.

Prior to writing the data modifications to storage cluster 104, a node may request a lock from transaction broker 114. Transaction broker 114 may manage the states of data of storage cluster 104, providing locks for writing data, checking for conflicts, and providing data timestamps 115. Transaction broker 114 may, for example, check lock table 116 to see whether any data conflicts exist for the data to be written. A data conflict may include, for example, determining if the data to be written had changed between timestamp 115 and the time when request for a lock is made. Or for example, another conflict may occur if the data is locked because another write transaction is modifying the data. In an embodiment, if such a data conflict is identified, no lock may be provided and the write transaction may be aborted.

Lock table 116 may track the status or states of various data versions available in storage cluster 104. For example, lock table 116 may identify the status as to which data is being written to by an ongoing transaction 112 (and which is not). Then, for example, based on this data transaction broker 114 may prevent data undergoing a first write transaction from being locked and written to simultaneously by a second write transaction. When the first write transaction has completed (e.g., the changes have been committed to storage cluster 104 or the transaction was aborted), the lock may be released and assigned to another write transaction, and timestamp 115 may be updated to indicate the new data that has been written to storage 104.

If no conflict is detected, transaction broker 114 may grant a lock on the data to the requesting node for the write transaction and update lock table 116. While data is locked however, other compute nodes 106 may access or read the data. In addition to providing a lock, transaction broker 114 may provide compute nodes 106 with a sequence number from sequencer 122 to write the data. Sequencer 122 may be a counter, such as an atomic counter, that increments or otherwise adjusts its count each time a sequence number is produced. The sequence number may correspond to a log position in distributed log 118, and ensure that multiple write transactions do not conflict with one another while writing or modifying data of storage cluster 104. Compute nodes 106 may then simultaneously write data to multiple storage nodes 120 for efficient write throughput corresponding to the log entry or sequence number.

As noted, in an embodiment, writes may be performed across multiple storage nodes 120A-C. Storage nodes 120A-C may be computing devices that store data of system 100 in persistent memory. In an embodiment, the data of a particular storage node 120 may be backed up on one more additional storage nodes 120 providing fault tolerance, in case of a failure of a storage node 120. Storage nodes 120A-C may be simultaneously accessed for both reads and/or writes.

In an embodiment, the number of storage nodes 120 to which data may be simultaneously accessed may be determined by a striping factor of storage cluster. The striping factor may indicate how many storage nodes 120 operate in parallel. For example a striping factor of three may indicate that three storage nodes 120 may simultaneously be accessed for read/write commands. The higher the striping factor, the higher the read/write throughput. The striping factor may be determined based on the number of available storage nodes 120, a redundancy factor of how many nodes have duplicate data, and other factors, including the number of compute nodes 106.

When a node receives a lock on data and a sequence number, the node may be ready to write the data across storage nodes 120A-C based on the striping factor. The actual mapping of the write transaction to storage nodes 120 may be determined by the node(s) performing the write transaction. For example, after a lock is acquired, a log position or sequence number from sequencer 122 may be assigned to the transaction 112 (including the node(s) performing the transaction 112). Then, for example, the mapping of the log position to the storage nodes 120A-C may be determined based on the striping factor.

In an embodiment, a write transaction may only write or append the data changes to a storage node 120. For example, storage node 120A may initially include an entry for table 1, row 5, col 6 as being "A" at time 1. A subsequent write transaction may change the value of table 1, row 5, col 6 to be "B" at time 2.

As noted above, compute nodes 106 may, periodically or upon receipt of a transaction 112, query whether their hosted data 108 has changed or needs to be updated. For example, compute nodes 106 may eagerly pull data from distributed log 118 or periodically poll storage cluster 104 for updates. If the hosted data has changed, storage nodes 120 may transmit the data updates to one or more compute nodes 106, or conversely compute nodes 106 may read the data updates for their hosted data 108 from storage nodes 120. In an embodiment, adjacent data entries may be stored on different storage nodes 120 in accordance with the striping factor discussed above, which may allow for both high read and write throughput. In continuing the non-limiting example, above, a compute node 106 that requests a data update for time 2, may be provided "B" for table 1, row 5, col 6. Storage node 120A may however maintain a record or log of past or previous data values, and may maintain that the previous value of table 1, row 5, col 6 used to be "A." Distributed log 118 may indicate that between time 1 and 2, the value of table 1, row 5, col 6 has changed.

Once a write transaction has completed, the node may update distributed log 118. The update to distributed log 118 may indicate that the write transaction has been committed to storage cluster 104 and the mapping as to which storage nodes 120 contain the data. Distributed log 118 may be a log that tracks the data updates of storage cluster 104 across storage nodes 120. In an embodiment, distributed log 118 may be a logical log with various portions stored across storage nodes 120 A-C. Distributed log 118 may track where data is stored on storage nodes 120, and when that data was updated. For example, compute nodes 120 may query distributed log 118 to determine if hosted data 108 has changed between a first (local) timestamp and a second timestamp 115.

After the distributed log 118 is updated, the node (that performed the write transaction) may send an acknowledgement message to transaction broker 114 indicating that the write transaction on the locked data has completed. Transaction broker 114 may then update lock table 116 to release the lock and updates the status of the data as available, free, or otherwise committed with an updated timestamp 115.

Thus, system 100 provides high read and write throughput by simultaneously managing and segregating a distributed transaction processing system (MPEC 102) and a memory management system (storage cluster 104). System 100 is able to capture the advantages of MPP transaction processing, while providing access to real-time streams of data as storage cluster 104 is continuously updated.

Figure 2:
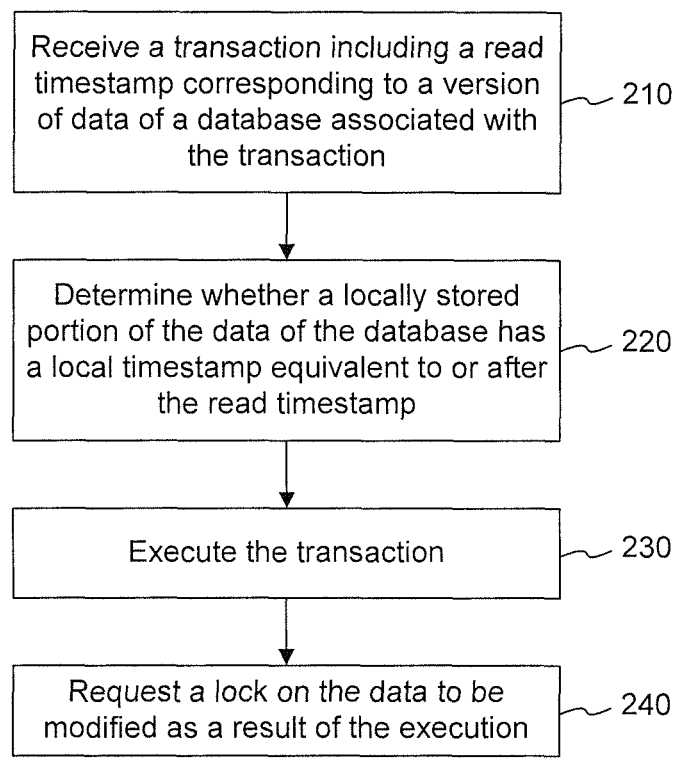
FIG. 2 is a flowchart illustrating a process for transaction processing in an MPP database system, according to an example embodiment.

FIG. 2 is a flowchart illustrating a process for transaction processing in an MPP database system, according to an example embodiment.

In step 210, MPEC 102 receives a transaction 112 that may include a read timestamp 115 corresponding to a version of data of a database associated with the query. For example, DQP 110 may receive transaction 112, which may include or be a query with a corresponding timestamp 115 as issued by transaction broker 114. Transaction 112 may need to access a portion of data of storage cluster 104.

In step 220, MPEC 102 determines whether a locally stored portion of the data of the database has a local timestamp that is equivalent to or after the read timestamp. For example, DQP 110 may assign transaction 112 one or more compute nodes 106A-D. The assigned compute nodes 106A-D may then verify whether hosted data 108 contains both the right data (e.g., from the right tables/rows/etc.) and timestamp that corresponds to transaction 112 and timestamp 115.

If a compute node 106 determines that it needs different data, or that the local timestamp of hosted data 108 is prior to the read timestamp 115 (or beyond a threshold of staleness associated with transaction 112), the compute node 106 may request a data update. In requesting a data update, the compute node 106 may query distributed log 118 to determine if the hosted data version 108 has been updated since the local timestamp. If the data has not been updated since the local timestamp of hosted data 108, the compute node 106 may update its local timestamp. If, however, the hosted data 108 has been updated or new data is otherwise needed, compute node 106 may query storage nodes 120 to receive the updates to the data and apply those updates (e.g., snapshots) to hosted data 108. After ensuring their data is up-to-date, the compute nodes 106 may process the transaction 112.

In step 230, one or more compute nodes 106 request a lock on the data of the database to be modified as a result of the executing. For example, if the processing of transaction 112 by compute nodes 106 resulted or otherwise requires data of storage nodes 104 to be updated, the modifications or changes may initially be locally cached in MPEC 102 or by each compute node 106.

In step 240, the compute nodes 106 may then request a lock on the data that is to be updated or modified from transaction broker 114. In different embodiments, locks may be provided on varying ranges of data. For example, a lock may be acquired or requested for each row, table, or partition of data.

In an embodiment, a single write transaction 112 may request a plurality of locks (e.g., for a plurality of rows of data) as an atomic request corresponding to the transaction 112. Then for example, either the requesting transaction 112 will receive all the locks it needs to perform, or will receive no locks. If the transaction 112 does not receive the lock(s) it requested, the transaction may be aborted.

Transaction broker 114 may query lock table 116 to determine if the data is currently being modified by another transaction or if any other data conflicts exist. If no data conflicts exist, transaction broker 114 assigns a lock on the data to the requesting compute node(s) 106 and updates the lock table 116.

Once the compute node 106 is provided the data lock, it may write the cached modifications across multiple storage nodes 120 for a high write throughput. Upon completion of the write transaction, distributed log 118 may be updated, and an acknowledgement may be sent to transaction broker 114 indicating the write has committed.

If, however, a lock is not received or the write failed for whatever reason, distributed log 118 is not updated and a message is sent to transaction broker 114 to release the lock. Upon completion (commit or abort) of the transaction 112, a message or signal may be sent to the requesting client (e.g., node requesting the transaction 112) as to whether the transaction 112 successfully completed, committed, or was otherwise aborted. In the case of a failure of the node execution the transaction 112, a held lock may be revoked after a time-out period occurs. This may cause the transaction 112 that was holding the lock to be aborted by the transaction broker 114. Then, for example, a sequence number or log number was assigned to the timed-out transaction 112, the log position may be filled in to further ensure the transaction 112 may not later commit.

Figure 3:
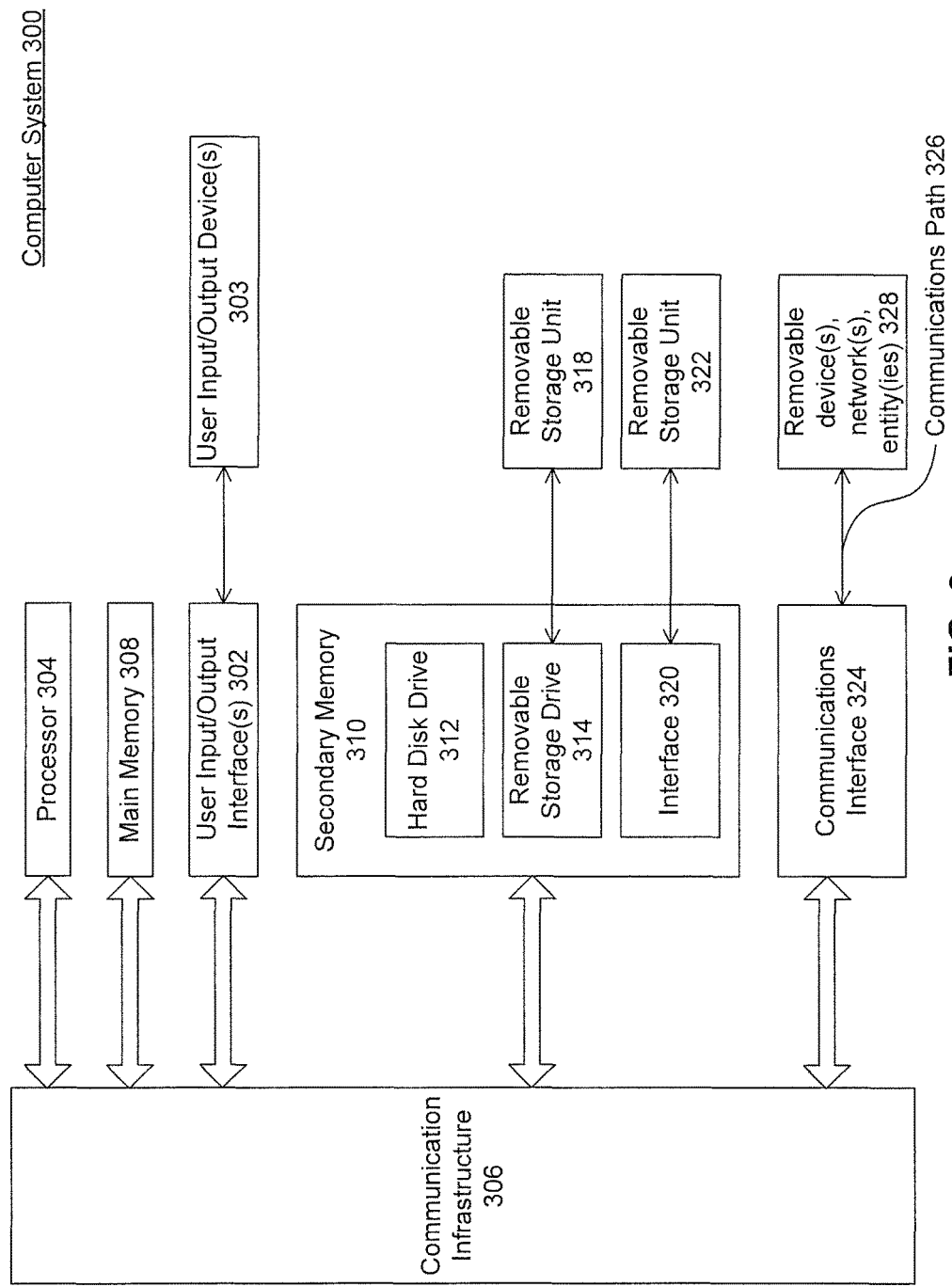
FIG. 3 is an example computer system useful for implementing various embodiments.

Various embodiments can be implemented, for example, using one or more well-known computer systems, such as computer system 300 shown in FIG. 3. Computer system 300 can be any well-known computer capable of performing the functions described herein.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 3. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method comprising:
   receiving a transaction including a read timestamp corresponding to a version of data of a database associated with the transaction, wherein the data of the database is stored across a plurality of storage nodes;
   determining whether a locally stored portion of the data of the database has a local timestamp that is equivalent to or after the read timestamp,
      updating the locally stored portion of data with modifications that occurred to the locally stored portion of data between the local timestamp and the read timestamp based on the determination that the local timestamp is prior to the read timestamp;
   reading the data of the locally stored portion;
   executing the transaction, wherein the execution comprises caching modifications to the data of the database to be performed as a result of the executing;
   determining that the data of the database to be modified as a result of the executing did not change during the executing; and
   requesting a lock on the data of the database to be modified as a result of the executing,
      wherein if the lock is received, updating the data of the database based on the cached modifications, and
      wherein if the lock is not received, aborting the updating of the data of the database based on the cached modifications.

2. The method of claim 1, wherein the database has a plurality of active versions of the data of the database.

3. The method of claim 1, wherein the transaction is executed by a plurality of compute nodes having read-only access to the data of the database until the lock is received.

4. The method of claim 1, wherein a distributed query processor allocates portions of the transaction to the plurality of compute nodes and assembles results from the plurality of compute nodes.

5. The method of claim 1, wherein each storage node includes a portion of a logical log of the database indicating current data of the database.

6. The method of claim 5, wherein the requesting a lock comprises:
   receiving the lock; and
   receiving a sequence number corresponding to a location in the logical log.

7. The method of claim 6, wherein the updating the data of the database comprises:
   writing the cached modifications across a plurality of the storage nodes simultaneously; and
   updating the location in the logical log upon completion of the writing.

8. The method of claim 1, wherein the updating the locally stored portion comprises:
   requesting from the storage nodes the modifications that occurred between the local timestamp and the read timestamp.

9. The method of claim 1, wherein the updating the locally stored portion comprises:
   requesting from the storage nodes additional data that was not locally stored but is necessary to process the query; and
   updating the locally stored portion to include the additional data.

10. The method of claim 1, wherein the determining whether a locally stored portion of the data of the database has a local timestamp that is equivalent to or after the read timestamp comprises:
    determining that the local timestamp that is older than the read timestamp but within a threshold for staleness of data associated with the query; and
    executing the query without requesting updated data.

11. The method of claim 1, further comprising sending a signal that the transaction has completed and the lock is to be released if the lock was received.

12. The method of claim 1, wherein the received transaction is a write transaction, and wherein the determining comprises:
    determining based on a distributed log that the locally stored portion of the data was not updated between the local timestamp and the read timestamp; and
    updating the local timestamp to the read timestamp.

13. The method of claim 1, further comprising:
    executing, across two or more of the storage nodes in parallel, a plurality of transactions to modify data.

14. A system, comprising:
    a memory; and
    at least one processor coupled to the memory and configured to:
       receive a transaction including a read timestamp corresponding to a version of data of a database associated with the transaction, wherein the data of the database is stored across a plurality of storage nodes;
       determine whether a locally stored portion of the data of the database has a local timestamp that is equivalent to or after the read timestamp,
       update the locally stored portion of data with modifications that occurred to the locally stored portion of data between the local timestamp and the read timestamp based on the determination that the local timestamp is prior to the read timestamp;

read the data of the locally stored portion;
execute the transaction, wherein the execution comprises caching modifications to the data of the database to be performed as a result of the executing;
determine that the data of the database to be modified as a result of the executing did not change during the executing; and
request a lock on the data of the database to be modified as a result of the executing,
wherein if the lock is received, updating the data of the database based on the cached modifications, and
wherein if the lock is not received, aborting the updating of the data of the database based on the cached modifications.

15. The system of claim 14, wherein a distributed transaction processor allocates portions of the transaction to the plurality of compute nodes and assembles results from the plurality of compute nodes.

16. The system of claim 14, wherein each storage node includes a portion of a logical log of the database indicating current data of the database.

17. The system of claim 16, wherein the request of the lock comprises:
receiving the lock; and
receiving a sequence number corresponding to a location in the logical log.

18. The system of claim 17, wherein the update to the data of the database comprises:
writing the cached modifications across a plurality of the storage nodes simultaneously; and
updating the location in the logical log upon completion of the writing.

19. The system of claim 14, wherein the update to the locally stored portion comprises:
requesting from the storage nodes the modifications that occurred between the local timestamp and the read timestamp.

20. A tangible computer-readable device having instructions stored thereon that, when executed by at least one computing device, causes the at least one computing device to perform operations comprising:
receiving a transaction including a read timestamp corresponding to a version of data of a database associated with the transaction, wherein the data of the database is stored across a plurality of storage nodes;
determining whether a locally stored portion of the data of the database has a local timestamp that is equivalent to or after the read timestamp,
updating the locally stored portion of data with modifications that occurred to the locally stored portion of data between the local timestamp and the read timestamp based on the determination that the local timestamp is prior to the read timestamp;
reading the data of the locally stored portion;
executing the transaction, wherein the execution comprises caching modifications to the data of the database to be performed as a result of the executing;
determining that the data of the database to be modified as a result of the executing did not change during the executing; and
requesting a lock on the data of the database to be modified as a result of the executing,
wherein if the lock is received, updating the data of the database based on the cached modifications, and
wherein if the lock is not received, aborting the updating of the data of the database based on the cached modifications.

* * * * *